United States Patent
Hirai

(10) Patent No.: US 8,294,910 B2
(45) Date of Patent: Oct. 23, 2012

(54) POWER SAVING IMAGE SCANNER AND CONTROL METHOD THEREOF

(75) Inventor: Masato Hirai, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 904 days.

(21) Appl. No.: 12/292,075

(22) Filed: Nov. 12, 2008

(65) Prior Publication Data

US 2009/0122362 A1   May 14, 2009

(30) Foreign Application Priority Data

Nov. 14, 2007   (JP) .................. 2007-295378

(51) Int. Cl.
G06F 3/12   (2006.01)

(52) U.S. Cl. ...... 358/1.13; 358/1.14; 358/421; 358/422; 358/474; 358/497; 347/104

(58) Field of Classification Search ............... 358/1.13, 358/1.14, 421, 422, 474, 497; 347/104
See application file for complete search history.

(56) References Cited

U.S. PATENT DOCUMENTS

| | | | | |
|---|---|---|---|---|
| 7,884,973 B2 * | 2/2011 | Sasaki | | 358/450 |
| 2003/0184814 A1 * | 10/2003 | Hashizume | | 358/437 |
| 2006/0193013 A1 * | 8/2006 | Hoshi | | 358/474 |
| 2006/0203306 A1 * | 9/2006 | Hoshi | | 358/497 |

FOREIGN PATENT DOCUMENTS

| | | | |
|---|---|---|---|
| JP | 2007-060211 | | 3/2007 |
| JP | 2007060211 A | * | 3/2007 |

OTHER PUBLICATIONS

Office Action issued on Jun. 7, 2011, in counterpart Japanese Application 2007-295378, four (4) pages.

* cited by examiner

*Primary Examiner* — Jacky X Zheng
(74) *Attorney, Agent, or Firm* — The Nath Law Group; Jerald L. Meyer; Robert T. Burns

(57) ABSTRACT

An image scanner operates in a normal mode in which an image scanning process is executable; and a power saving mode in which less electric power is consumed than in the normal mode. The image scanner includes: a CPU for switching the image scanner between the normal mode and the power saving mode; an original size sensor circuit; and an FPGA connected to the CPU and the original size sensor circuit. In the normal mode, the CPU configures, in the FPGA, a normal-mode circuit needed for the image scanning process. When the image scanner transfers from the normal mode to the power saving mode, the CPU configures, in the FPGA, a power-saving-mode circuit for communicating with the original size sensor circuit, and stops the original size sensor circuit from operating. The power-saving-mode circuit is smaller in circuit size than the normal-mode circuit.

18 Claims, 4 Drawing Sheets

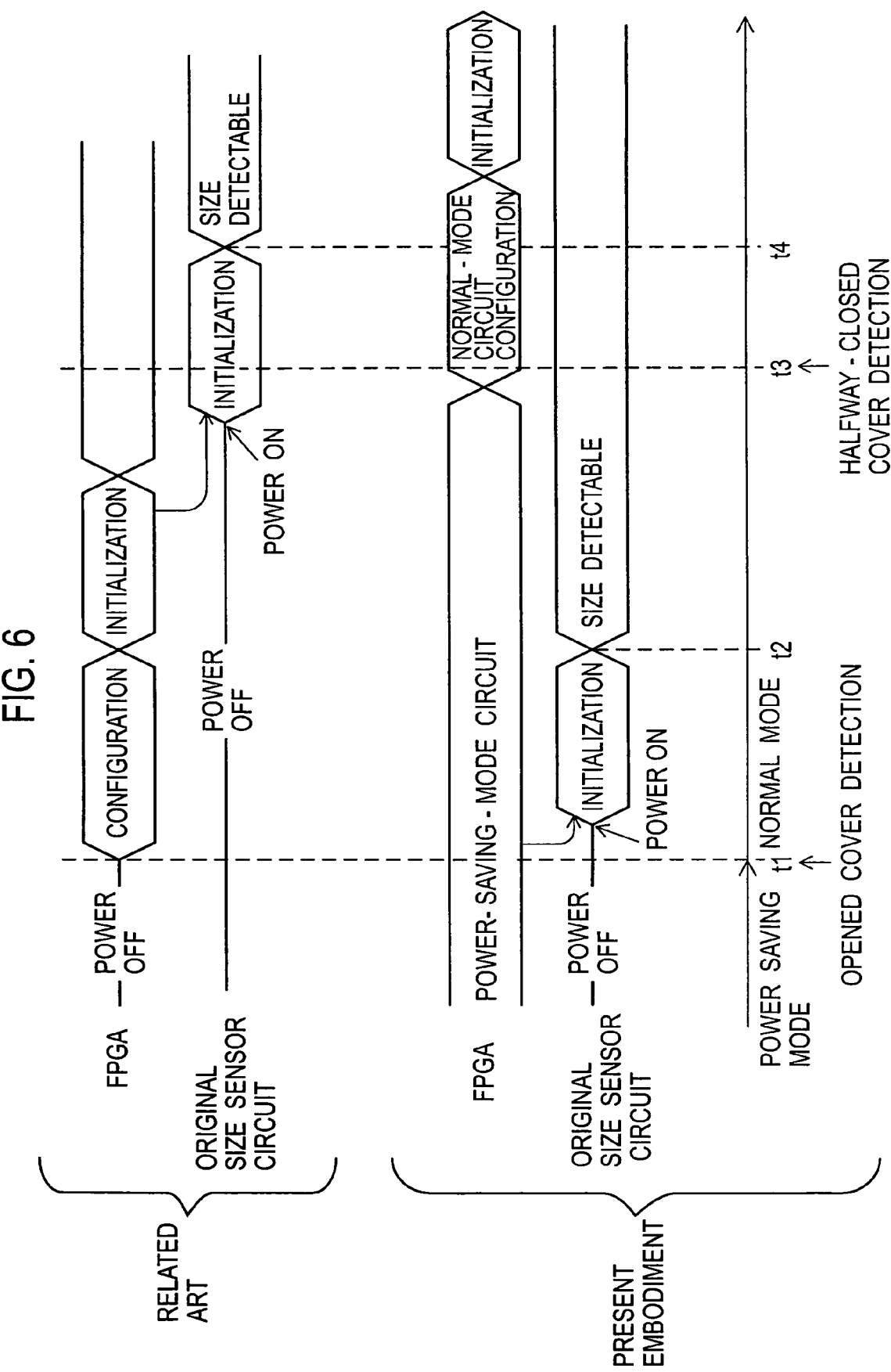

POWER SAVING IMAGE SCANNER AND CONTROL METHOD THEREOF

CROSS REFERENCE TO RELATED APPLICATION

This application is based upon and claims the benefit of priority from the prior Japanese Patent Application No. 2007-295378, filed on Nov. 14, 2007, the entire contents of which are incorporated herein by reference.

BACKGROUND OF THE INVENTION

1. Field of the Invention

The present invention relates to an image scanner and a control method thereof. Particularly, the present invention relates to an image scanner which includes a power saving function, and which is capable of quickly performing necessary processes when the image scanner is returned to a normal mode from a power saving mode, as well as a method of controlling the image scanner.

2. Description of the Related Art

Recently, power saving in image scanners has been promoted, as in the disclosure in Japanese Unexamined Patent Publication No. 2007-060211. Therefore, commonly used are image scanners having a power saving mode in which less power is consumed than in a normal operation mode. FIG. 1 is a block diagram showing a part of a configuration of such an image scanner having the power saving mode.

As shown in FIG. 1, the image scanner includes: an original size sensor circuit 240 configured to detect the size of an original placed for scanning on an unillustrated platen; and a cover open sensor 260 configured to detect whether an unillustrated platen cover is opened or closed. The cover open sensor 260 detects that a user is in the process of closing the platen cover which has been opened to place the original on the platen. Then, at this detection timing, the original size sensor circuit 240 detects the size of an original placed on the platen, and informs a CPU 220 of the size of the original. Such size detection is employed because the original size sensor circuit 240 cannot detect the size of the original in a state where the platen cover is fully closed. Specifically, the original size sensor circuit 240 perceives the size of the original by detecting light which reflects from the original. Once the platen cover is fully closed, the original size sensor circuit 240 detects light reflecting from not only the original but also the platen cover, and accordingly cannot detect the size of the original.

In the image scanner shown in FIG. 1, the CPU 220 acquires the size of the original recognized by the original size sensor circuit 240 through a field programmable gate array (FPGA) 230. In this respect, the FPGA 230 is an integrated circuit capable of configuring a logic circuit by loading circuit information.

For the purpose of enhancing the power saving effect in such a configuration, a scheme of stopping power supply to the FPGA 230 and the original size sensor circuit 240 when the image scanner enters the power saving mode is under consideration. On the other hand, the normal power supply to the cover open sensor 260 continues even in the power saving mode, because the cover open sensor 260 needs to detect that the platen cover is opened.

Once the power supply to the FPGA 230 is stopped, the logic circuit quickly volatilizes (disappears) in the FPGA 230. With this taken into consideration, once the cover open sensor 260 detects that the platen cover is opened in power saving mode, first of all, it is necessary to configure a process circuit 231 in the FPGA 230 by loading circuit information to the FPGA 230. For this reason, only after the process circuit 231 is configured in the FPGA 230, the CPU 220 can communicate with the original size sensor circuit 240, and thus can activate the original size sensor circuit 240.

As described above, the CPU 220 acquires the size of the original while the platen cover is in the process of being closed after the platen cover is once opened. For this reason, if a user closes the platen cover before the CPU 220 activates the original size sensor circuit 240, the CPU 220 fails to acquire the size of the original. As a result, the user is forced to open and then close the platen cover again after the CPU 220 activates the original size sensor circuit 240. This deteriorates the usability of the image scanner.

If power supply to the original size sensor circuit 240 and the FPGA 230 continues in the power saving mode to avoid the problem of the usability deterioration, the continued power supply decreases the power saving effect.

SUMMARY OF THE INVENTION

An object of the present invention is to provide an image scanner that is capable of becoming ready for an original size detection process within a short time after returning from a power saving mode, while maintaining its power saving effect, and to provide a method of controlling the image scanner.

To achieve the above object, a first aspect of the present invention is an image scanner comprising: a control unit configured to switch modes between a normal mode for executing an image scanning process and a power saving mode for consuming less electric power than the normal mode, depending on a predetermined condition; an original size detection unit configured to detect a size of an original; and an integrated circuit configured to allow a logic circuit to be configured in the integrated circuit based on circuit information, the integration circuit connected to the control unit and the original size detection unit, wherein the control unit is configured to: in the normal mode, configure a normal-mode circuit in the integrated circuit, the normal mode circuit needed for the image scanning process, and when transferring the normal mode to the power saving mode, configure a power-saving-mode circuit in the integrated circuit, the power-saving-mode circuit used for communicating with the original size detection unit and being smaller in circuit size than the normal-mode circuit, and concurrently stop the original size detection unit from operating.

According to the first aspect of the present invention, the image scanner is able to maintain its power saving effect. That is because the operation of the original size detection unit is stopped in the power saving mode, and because the power saving circuit of a small circuit size only needs to be held in the integrated circuit. In addition, the first aspect thereof is capable of shortening the time required for the image scanner to become ready for the original size detection process, because the original size detection unit only needs to be activated without re-configuring the power saving circuit in the integrated circuit.

The control unit may activate the original size detection unit through the integrated circuit when transferring the power saving mode to the normal mode, and then configure the normal-mode circuit in the integrated circuit.

The control unit may transfer the normal mode to the power saving mode upon no operation from the user being made to the image scanner for a predetermined time period.

The control unit may transfer the power saving mode to the normal mode upon an operation from the user being made to the image scanner.

The image scanner may further comprise: a platen cover; and a cover open detection unit configured to detect whether the platen cover is opened or closed, wherein the power-saving-mode circuit may comprise a circuit for communicating with the cover open detection unit, and the control unit transfers the power saving mode to the normal mode upon detecting that the platen cover is opened through the integrated circuit in the power saving mode.

The control unit may activate the original size detection unit through the integrated circuit when transferring the power saving mode to the normal mode, and the original size detection unit may detect the size of the original upon the cover open detection unit detecting that the platen cover is in a process of being closed after detecting that the platen cover is opened.

To achieve the above object, a second aspect of the present invention is a method for controlling an image scanner comprising: switching, by a control unit, modes between a normal mode for executing an image scanning process and a power saving mode for consuming less electric power than the normal mode, depending on a predetermined condition; detecting a size of an original by an original size detection unit; in the normal mode, configuring, by the control unit, a normal-mode circuit in an integrated circuit connected to the control unit and the original size detection unit, the normal-mode circuit needed for the image scanning process; and when the normal mode is transferred to the power saving mode, configuring, by the control unit, a power-saving-mode circuit in the integrated circuit, the power-saving-mode circuit used for communicating with the original size detection unit and being smaller in circuit size than the normal-mode circuit, and concurrently stopping, by the control unit, the original size detection unit from operating.

According to the second aspect of the present invention, the same effects as the first aspect of the present invention can be brought about.

The method may further comprise: activating, by the control unit, the original size detection unit through the integrated circuit when transferring the power saving mode to the normal mode; and then configuring, by the control unit, the normal-mode circuit in the integrated circuit.

The step of transferring the normal mode to the power saving mode may be triggered by no operation from the user being made to the image scanner for a predetermined time period.

The step of transferring the power saving mode to the normal mode may be triggered by an operation from the user being made to the image scanner.

The power-saving-mode circuit may comprise a circuit for communicating with a cover open detection unit configured to detect whether a platen cover is opened or closed, and the method may further comprise transferring, by the control unit, the power saving mode to the normal mode upon detecting that the platen cover is opened through the integrated circuit in the power saving mode.

The method may further comprise: activating, by the control unit, the original size detection unit through the integrated circuit when transferring the power saving mode to the normal mode; and detecting the size of the original by the original size detection unit upon the cover open detection unit detecting that the platen cover is in a process of being closed after detecting that the platen cover is opened.

The foregoing configuration is capable of shortening the time required for the image scanner to become ready for the original size detection process after returning from the power saving mode, while maintaining its power saving effect maintained.

BRIEF DESCRIPTION OF THE DRAWINGS

FIG. 6 is a diagram showing timing charts, at a time of transferring from the power saving mode to the normal mode, of the image scanner according to the embodiment of the present invention and a scanner according to the related art in a comparative manner.

DETAILED DESCRIPTION OF THE EMBODIMENT

Figure 2:
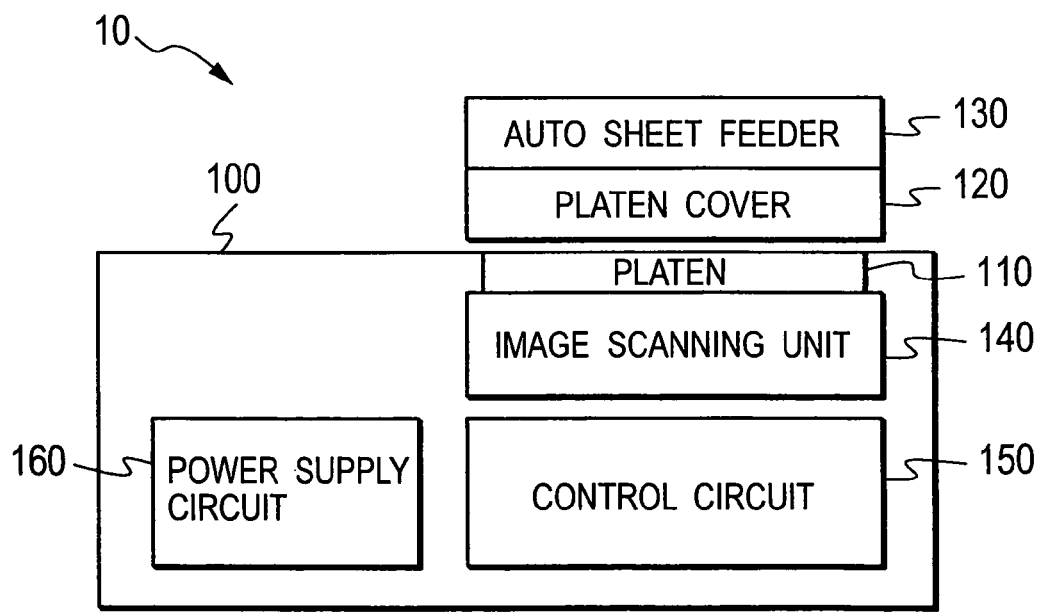
FIG. 2 is a block diagram showing a schematic configuration of an image scanner according to an embodiment of the present invention.

Descriptions will be provided hereinbelow for the embodiment of the present invention on the basis of the drawings. While the following drawings are described, the same or similar components are denoted by the same or similar reference numerals. FIG. 2 is a block diagram showing a schematic configuration of an image scanner 10 according to the present embodiment. The image scanner 10 employs a flatbed system in which an original is fixed to be scanned. The image scanner 10 includes: a scanner main body 100 including a platen 110 on which to place an original; a platen cover 120 configured to cover the platen 110; and an auto sheet feeder 130 integrated with the platen cover 120 and configured to automatically feed an original to the platen 110. Examples representing the image scanner 10 include a scanner apparatus, a copier, a facsimile machine and a multifunctional printer. The present invention is applicable to these machines, but not limited to these machines.

The scanner main body 100 includes: an image scanning unit 140, a control circuit 150 and a power supply circuit 160. The image scanning unit 140 includes: a line sensor including image scanning elements arranged in a line, such as Charge Coupled Devices (CCDs); a light source; a carriage on which to mount the line sensor; and a motor configured to carry the carriage; and the like. The control circuit 150 includes a CPU, memories, a signal processor, a communications processor, and the like. The power supply circuit 160 is configured to supply an electric power to each unit.

Operational modes of the image scanner 10 according to the present embodiment include a normal mode and a power saving mode. The normal mode is a state in which the image scanner 10 is capable of carrying out an image scanning process. In the normal mode, the image scanner 10 consumes an electric power to some extent even in a case where the image scanner 10 is carrying out no image scanning process. That is because the image scanner 10 needs to be ready to quickly respond to a user's operations. The power saving mode is a mode in which the image scanner 10 consumes less electric power than in the normal mode by stopping power supply to a predetermined circuit and stopping some functions, for example.

In the power saving mode, the image scanner 10 is capable of carrying out no image scanning process. For this reason, when an image scanning process is carried out, the image sensor 10 needs to transfer from the power saving mode to the normal mode by detecting the user's operations. The image scanner 10 transfers from the normal mode to the power saving mode in a case where a predetermined condition is satisfied, for example, in a case where the image scanner 10 receives no operation from the user for a predetermined time period.

Figure 3:
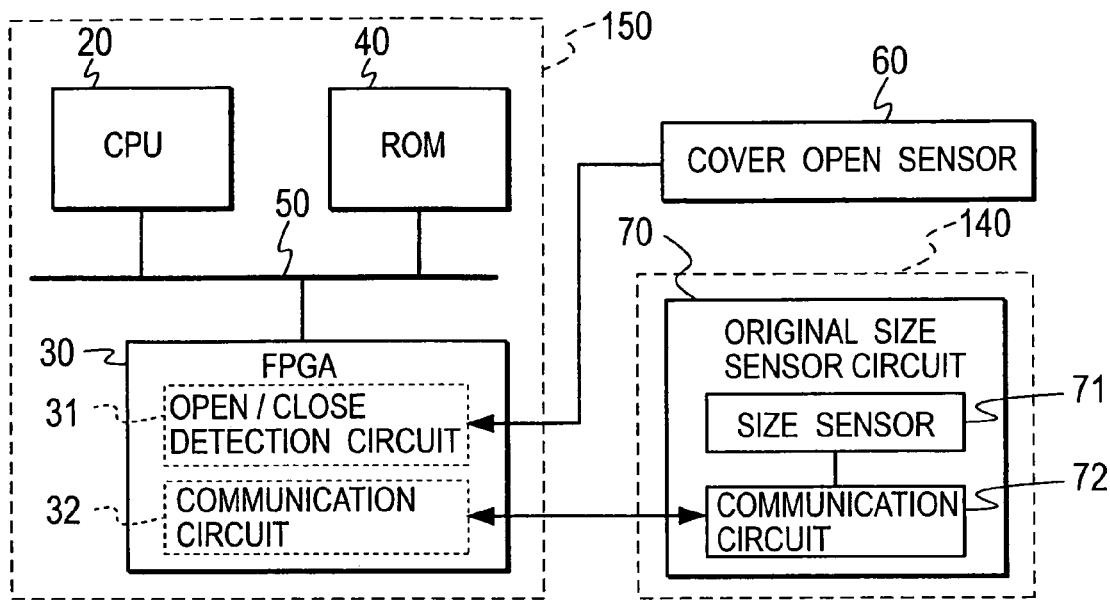
FIG. 3 is a detailed block diagram showing functional units characteristic of the image scanner according to the embodiment of the present invention.

FIG. 3 is a block diagram showing functional units characteristic of the image scanner 10 according to the present embodiment. For the sake of simplicity, functional units which are not important to the descriptions provided for the present embodiment are omitted from FIG. 3.

As shown in FIG. 3, the control circuit 150 includes a CPU 20, an FPGA 30 and a Read-Only Memory (ROM) 40. The CPU 20, the FPGA 30 and the ROM 40 are connected together through a system bus 50. In this respect, the FPGA 30 is an integrated circuit in which a logic circuit can be configured by loading circuit information to the FPGA 30.

Programs and the circuit information for the configuration are recorded in the ROM 40 in a nonvolatile manner. In accordance with the programs recorded in the ROM 40, the CPU 20 loads the circuit information to the FPGA 30 and configures a logic circuit in the FPGA 30. However, the circuit information for the configuration may be recorded in a ROM different from that in which the programs are recorded. The configured logic circuits are erased in the FPGA 30 used for the present embodiment, when the power supply to the FPGA 30 is stopped. With this taken into consideration, for the purpose of retaining the configured logic circuits in the FPGA 30, it is necessary to continue supplying an electric power to the FPGA 30 depending on the size of the logic circuits.

A cover open sensor 60 configured to detect whether the platen cover 120 is opened or closed is provided in a vicinity of a connection point between the sensor main body 100 and the platen cover 120. In the present embodiment, the cover open sensor 60 is configured to detect that the platen cover 120 is opened after being closed, and that the platen cover 120 is closed halfway, as well as thus to inform the FPGA 30 of the two detected states. However, the state of the platen cover 120 detected by the cover open sensor 60 is not limited to these states.

The image scanning unit 140 includes an original size sensor circuit 70 configured to detect the size of an original placed on the platen 110. The original size sensor circuit 70 includes: a size sensor 71 in which multiple sets of light receiving elements are arranged according to standard sizes; and a communication circuit 72 configured to communicate with the FPGA 30. In the present embodiment, the original size sensor circuit 70 is configured to detect the size of an original on the basis of light reflected by the original. For this reason, the original size sensor circuit 70 is not capable of detecting the size of the original after the platen cover 120 is fully closed because the original size sensor circuit 70 also detects light reflected by the platen cover 120. With this taken into consideration, the original size sensor circuit 70 is designed to detect that the platen cover 120 is closed halfway after opened and before fully closed, and thus to detect the size of the original by use of reflected light while the platen cover 120 is closed halfway.

Once a user opens the platen cover 120 while the image scanner 10 is put in power saving mode, the image scanner 10 needs to enter the normal mode to become ready for an image scanning process. To this end, the cover open sensor 60 is designed not to sleep even in the power saving mode, and to continue monitoring the state of the platen cover 120.

On the other hand, in the power saving mode, the electric power supply to the original size sensor circuit 70 is stopped for the purpose of enhancing the power saving effect. Nevertheless, once the user opens the platen cover 120 in the power saving mode, the original size sensor circuit 70 needs to detect the size of an original when the platen cover 120 is subsequently closed halfway. With this taken into consideration, once the cover open sensor 60 detects that the platen cover 120 is opened, the electric power supply to the original size sensor circuit 70 is resumed. At this time, the original size sensor circuit 70 needs to undergo a predetermined initialization process. In general, this initialization process can be completed within a short time period.

In the present embodiment, two types of circuit information are recorded in the ROM 40. One type of circuit information is for a logic circuit to be configured in the FPGA 30 in the normal mode and is similar to the circuit information of the conventional type of image scanner. This type of circuit information includes circuit information used to configure a logic circuit necessary for the image scanning process. The other type of circuit information is for a logic circuit to be configured in the FPGA 30 in the power saving mode and is characteristic of the present embodiment. Hereinafter, the former circuit information will be referred to as "normal-mode circuit information," and the latter circuit information will be referred to as "power-saving-mode circuit information."

The power-saving-mode circuit information includes circuit information needed to configure logic circuits configured to execute: a process of detecting an information signal from the cover open sensor 60, and thus of informing the CPU 20 of the cover opening; and a process of communicating with the original size sensor circuit 70. By use of these pieces of circuit information, in the FPGA 30, there are configured an open/close detection circuit 31 configured to execute the process of detecting a signal from the cover open sensor 60 and of informing the CPU 20 of the cover opening in the power saving mode as well as a communication circuit 32 configured to execute the process of communicating with the original size sensor circuit 70 in the power saving mode.

As described above, the logic circuits configured by use of the power-saving-mode circuit information are those configured to execute the minimum necessary processes in the power saving mode. For this reason, these logic circuits can be configured in a far smaller size than the logic circuits configured by use of the normal-mode circuit information. This makes it possible to have a reduced electric power needed to retain the logic circuits in the power saving mode in comparison with an electric power needed to retain the logic circuits necessary for an image scanning process.

Figure 4:
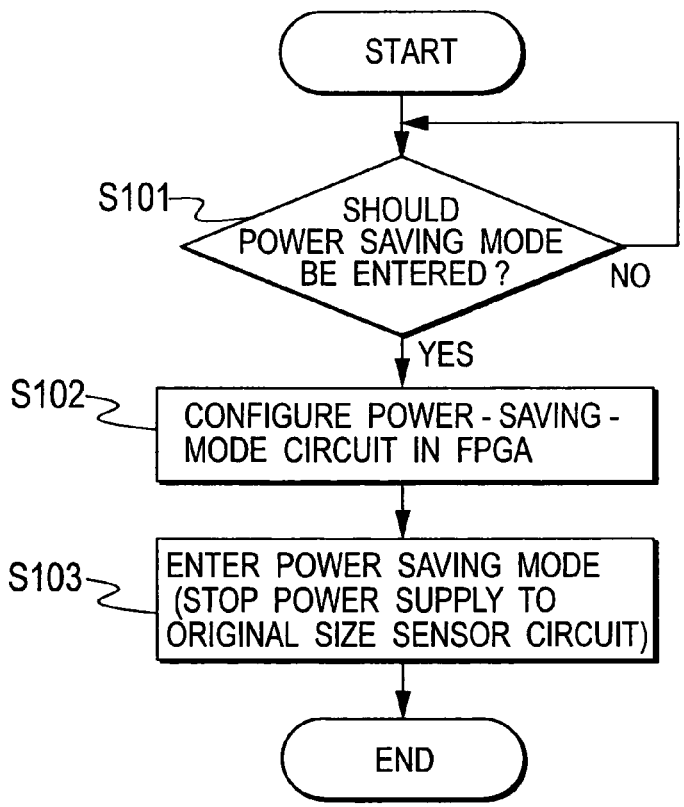
FIG. 4 is a flowchart for explaining a process for transferring the image scanner according to the embodiment of the present invention from a normal mode to a power saving mode.

Next, descriptions will be provided for an operation characteristic of the image scanner 10 according to the present embodiment. FIG. 4 is a flowchart showing a process which is carried out when the image scanner 10 transfers from the normal mode to the power saving mode. In the normal mode, the normal-mode circuit information is loaded to the FPGA 30, and thus the normal-mode circuits needed for an image scanning operation are configured in the FPGA 30. The logic circuits configured by use of the normal-mode circuit information are referred to as the "normal-mode circuits," and the logic circuits configured by use of the power-saving-mode circuit information are referred to the "power-saving-mode circuits."

In the normal mode, the CPU 20 determines whether or not the current status of the image scanner 10 satisfies predetermined conditions for transfer to the power saving mode (step S101). As described above, examples of the conditions for transfer to the power saving mode include a case where the image scanner 10 has not been manipulated by a user for a certain time.

As a result of the determination, in the case where the image scanner 10 satisfies the conditions for transfer to the power saving mode (Yes in step S101), the CPU 20 loads the power-saving-mode circuit information to the FPGA 30, and thus configures the power-saving-mode circuits in the FPGA 30 (step S102). At this time, the normal-mode circuits may be erased. Subsequently, the FPGA 30 undergoes a predetermined initialization process, and starts its operation as the power-saving-mode circuits.

Thereafter, the image scanner 10 enters the power saving mode by carrying out the usual processes (step S103). At this time, the power supply to the original size sensor circuit 70 is stopped, but the power supply to the cover open sensor 60 continues. The FPGA 30 operates as the power-saving-mode circuit, and thus monitors a cover open signal from the cover open sensor 60.

Figure 5:
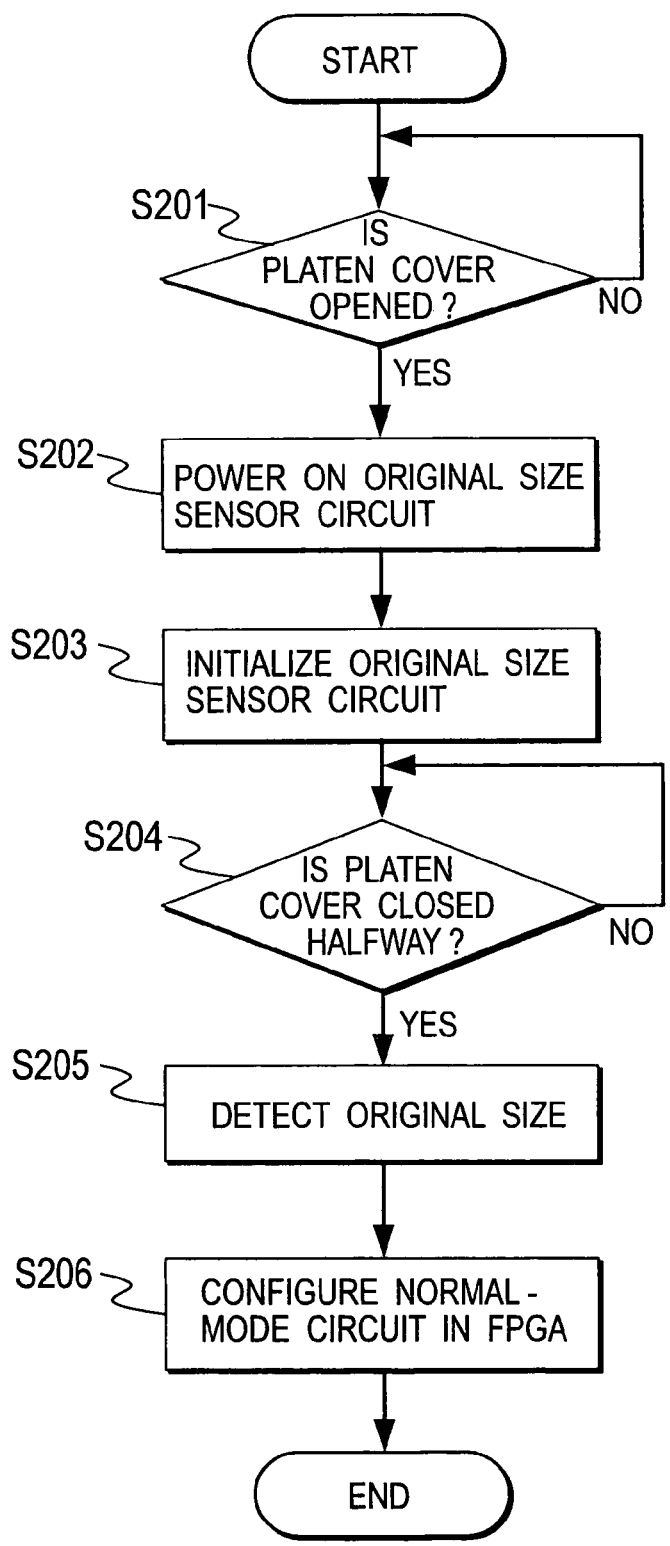
FIG. 5 is a flowchart for the explaining a process for transferring the image scanner according to the embodiment of the present invention from the power saving mode to the normal mode.

Next, referring to a flow chart shown in FIG. 5, descriptions will be provided for a process carried out when the image scanner 10 transfers from the power saving mode to the normal mode. Conditions for transfer from the power saving mode to the normal mode include not only a below-described case where the platen cover 120 is opened, but also a case where an original is placed on the auto sheet feeder 130 and a case where an operation panel (not illustrated) is operated. Here, descriptions will be provided on the assumption that the platen cover 120 is opened.

In the power saving mode, the CPU 20 determines whether or not the platen cover 120 is opened (step S201). Once the platen cover 120 is opened in the power saving mode, the cover open sensor 60 detects the opening of the platen cover 120, and sends a cover open signal to the open/close detection circuit 31 in the FPGA 30. On the basis of the signal, the open/close detection circuit 31 in the FPGA 30 informs the CPU 20 of the cover opening.

Once the platen cover 120 is opened (Yes in step S201), the power supply to the original size sensor circuit 70 is resumed (step S202). Once the original size sensor circuit 70 is activated, the CPU 20 communicates with the original size sensor circuit 70 through the communication circuit 32 in the FPGA 30, and causes the original size sensor circuit 70 to undergo its initialization process (step S203).

After the platen cover 120 is detected as being opened, the CPU 20 determines whether or not the platen cover 120 is almost fully closed, that is, whether or not the platen cover 120 is closed halfway (step S204). When a user closes the platen cover 120 halfway toward the full closure, the cover open sensor 60 detects the state of the platen cover 120, and thus sends a halfway-closure signal to the open/close detection circuit 31 in the FPGA 30. On the basis of the signal, the open/close detection circuit 31 in the FPGA 30 informs the CPU 20 of the halfway-closure.

Once the platen cover 120 is closed halfway (Yes in step S204), the original size sensor circuit 70 which has just initialized detects the size of the original. The original size sensor circuit 70 informs the CPU 20 of a result of the detection through the communication circuit 32 in the FPGA 30.

Thereafter, the CPU 20 loads the normal-mode circuit information to the FPGA 30, and thus configures the normal-mode circuits in the FPGA 30 (step S206). At this time, the power-saving-mode circuits may be erased. Subsequently, the FPGA 30 undergoes a predetermined initialization process, and starts its operation as the normal-mode circuits. Although it take some time to configure the normal-mode circuits in the FPGA 30 by loading the normal-mode circuit information and to initialize the FPGA 30, it suffices if the configuration and the initialization process are completed before the image scanner starts the image scanning process.

Next, descriptions will be provided for effects of the present embodiment by referring to a timing chart of FIG. 6 indicating the timing of each operation of the image scanner 10 at a time of transferring from the power saving mode to the normal mode. For the comparison purpose, FIG. 6 includes a timing chart (an upper half of the drawing) of an image scanner according to the related art at a time of transferring from the power saving mode to the normal mode.

Figure 1:
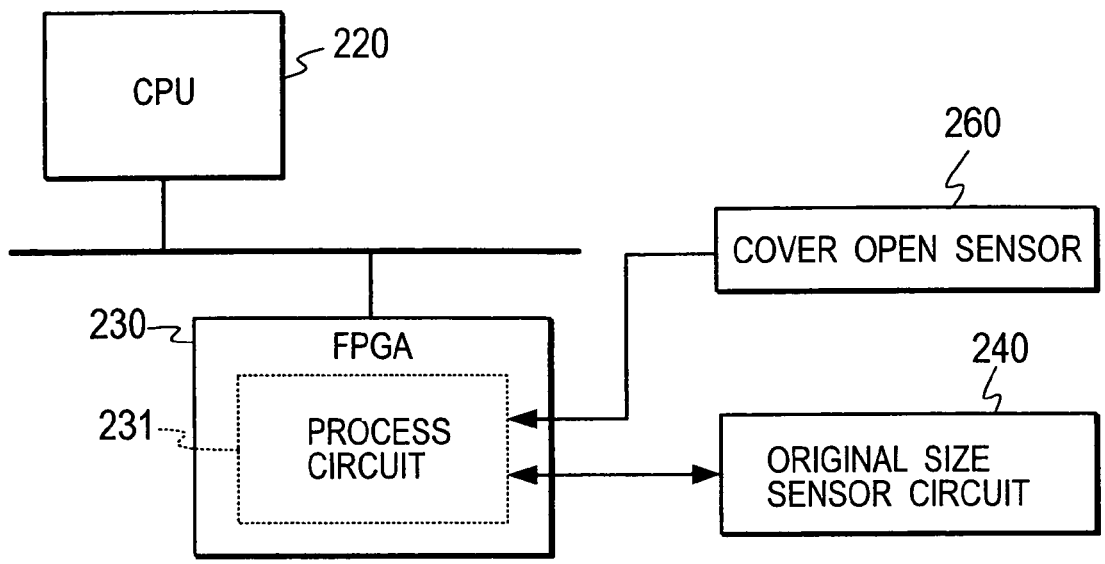
FIG. 1 is a block diagram showing a chief configuration of an image scanner according to the related art.

First of all, descriptions will be provided for the timing diagram of the image scanner according to the related art by referring to not only FIG. 6 but also FIG. 1. The process circuit 231 configured in the FPGA 230 is large in circuit size, and accordingly an electric power needed to retain the process circuit 231 in the FPGA 230 is nonnegligibly large. For this reason, the FPGA 230 is powered off in power saving mode. The original size sensor circuit 240 is also powered off for the purpose of increasing the power saving effect as well.

Once the platen cover 120 is opened at time t1, the CPU 220 loads the process circuit information to the FPGA 230, and thus configures the process circuit 231 in the FPGA 230. Subsequently, the CPU 220 initializes the FPGA 230. Since the process circuit 231 is large in circuit size, it takes some time to configure the process circuit 231 in the FPGA 230 by loading the process circuit information and to initialize the FPGA 30.

Once the process circuit 231 starts its operation after the end of the initialization process, the process circuit 231 becomes capable of communicating with the original size sensor circuit 240. Thereby, the CPU 220 resumes the power supply to the original size sensor circuit 240, and thus initializes the original size sensor circuit 240. Only after time t4 when the initialization process is completed in the original size sensor circuit 240, the original size sensor circuit 240 is capable of detecting the size of the original. For this reason, if the user closes the platen cover 120, for example, at time t3 preceding time t4, the original size sensor circuit 240 fails to detect the size of the original. This forces the user to open and then close the platen cover 120 once again.

Next, descriptions will be provided for the timing diagram of the image scanner according to the embodiment of the present invention. In the power saving mode, the power-saving-mode circuit is configured in the FPGA 30. Since the power-saving-mode circuit is small in circuit size, it is possible to decrease the electric power needed to retain the circuit. In addition, the original size sensor circuit 70 is powered off for the purpose of enhancing the power saving effect.

Once the opening of the platen cover 120 is detected at time t1, the CPU 20 is immediately capable of resuming supplying an electric power to the original size sensor circuit 70, and thus of initializing the original size sensor circuit 70. This is because the CPU 20 is already capable of communicating with the original size sensor circuit 70 through the communication circuit 32 in the FPGA 30 at time t1.

After time t2 when the initialization process is completed in the original size sensor circuit 70, the original size sensor circuit 70 is capable of detecting the size of the original. For this reason, the original size sensor circuit 70 becomes ready to detect the size of the original earlier than the original size sensor circuit 240 in the image scanner according to the related art. Specifically, the image scanner according to the related art has to wait until time t4 to become capable of detecting the size of the original at time t4, whereas the image scanner according to the embodiment of the present invention becomes capable of detecting the size of the original at time t2. Even in a case where, for example, the user closes the platen cover 120 at time t3 mentioned above, the image scanner according to the embodiment of the present invention is capable of detecting the size of the original.

The image scanner according to the embodiment of the present invention is capable of configuring the normal-mode circuits in the FPGA 30 by loading the normal-mode circuit information to the FPGA 30 and initializing the FPGA 30 separately from the activation of the original size sensor circuit 70. It suffices if the configuration and the initialization process are completed before the image scanner starts the image scanning process.

The image scanner and the control method thereof according to the embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiment of the present invention are only a list of optimum effects achieved by the present invention. Hence, the effects of the present invention are not limited to those described in the embodiment of the present invention.

What is claimed is:

1. An image scanner comprising:
    a control unit configured to switch modes between a normal mode for executing an image scanning process and a power saving mode for consuming less electric power than the normal mode, depending on a predetermined condition;
    an original size detection unit configured to detect a size of an original;
    a timing detection unit configured to detect a timing for transferring the power saving mode to the normal mode; and
    an integrated circuit configured to allow a logic circuit to be configured in the integrated circuit based on circuit information, the integration circuit connected to the control unit, the original size detection unit, and the timing detection unit,
    wherein the control unit is configured to:
    in the normal mode, configure a normal-mode circuit in the integrated circuit, the normal mode circuit needed for the image scanning process,
    when transferring the normal mode to the power saving mode, configure a power-saving-mode circuit in the integrated circuit, the power-saving-mode circuit configured for communicating with the original size detection unit and with the timing detection unit during the power saving mode and being smaller in circuit size than the normal-mode circuit, and concurrently stop the original size detection unit from operating, and
    hold the power saving mode circuit in the integrated circuit during the power saving mode; and wherein:

when transferring the power saving mode to the normal mode, the original size detection unit is configured to be activated without having to reconfigure the power-saving-mode circuit in the integrated circuit, and
    the control unit is configured to resupply power to and initialize the original size detection unit by communicating through the power-saving mode circuit.

2. The image scanner according to claim 1, wherein the control unit
    activates the original size detection unit through the integrated circuit when transferring the power saving mode to the normal mode, and
    then configures the normal-mode circuit in the integrated circuit.

3. The image scanner according to claim 1, wherein the control unit transfers the normal mode to the power saving mode upon no operation from the user being made to the image scanner for a predetermined time period.

4. The image scanner according to claim 1, wherein the control unit transfers the power saving mode to the normal mode upon an operation from the user being made to the image scanner.

5. The image scanner according to claim 1, further comprising:
    a platen cover; wherein
    the timing detection unit is a cover open detection unit configured to detect whether the platen cover is opened or closed,
    the power-saving-mode circuit comprises a circuit for communicating with the cover open detection unit, and
    the control unit transfers the power saving mode to the normal mode upon detecting that the platen cover is opened through the integrated circuit in the power saving mode.

6. The image scanner according to claim 5, wherein
    the control unit activates the original size detection unit through the integrated circuit when transferring the power saving mode to the normal mode, and
    the original size detection unit detects the size of the original upon the cover open detection unit detecting that the platen cover is in a process of being closed after detecting that the platen cover is opened.

7. The image scanner according to claim 1, wherein the normal mode circuit and the power saving mode circuit are supplied with power from a single power supply.

8. The image scanner according to claim 1, wherein the control unit is configured to resupply power to and initialize the original size detection unit upon detection of an opening of a platen cover.

9. The image scanner according to claim 8, wherein the control unit is immediately capable of resupplying power to and initializing the original size detection unit upon detection of an opening of a platen cover.

10. A method for controlling an image scanner comprising:
    switching, by a control unit, modes between a normal mode for executing an image scanning process and a power saving mode for consuming less electric power than the normal mode, depending on a predetermined condition;
    detecting a size of an original by an original size detection unit;
    detecting a timing for transferring the power saving mode to the normal mode by a timing detection unit;
    in the normal mode, configuring, by the control unit, a normal-mode circuit in an integrated circuit connected to the control unit and the original size detection unit, the normal-mode circuit needed for the image scanning process;

when transferring the normal mode to the power saving mode, configuring, by the control unit, a power-saving-mode circuit in the integrated circuit, the power-saving-mode circuit configured for communicating with the original size detection unit and with the timing detection unit during the power saving mode and being smaller in circuit size than the normal-mode circuit, and concurrently stopping, by the control unit, the original size detection unit from operating;

holding the power saving mode circuit in the integrated circuit during the power saving mode;

activating the original size detection unit without reconfiguring the power-saving-mode circuit in the integrated circuit when transferring the power saving mode to the normal mode; and resupplying power to and initializing the original size detection unit by the control unit by communicating through the power-saving-mode circuit.

11. The method for controlling an image scanner according to claim 10, further comprising:

activating, by the control unit, the original size detection unit through the integrated circuit when transferring the power saving mode to the normal mode; and then configuring, by the control unit, the normal-mode circuit in the integrated circuit.

12. The method for controlling an image scanner according to claim 10, wherein the step of transferring the normal mode to the power saving mode is triggered by no operation from the user being made to the image scanner for a predetermined time period.

13. The method for controlling an image scanner according to claim 10, wherein the step of transferring the power saving mode to the normal mode is triggered by an operation from the user being made to the image scanner.

14. The method for controlling an image scanner according to claim 10, wherein the power-saving-mode circuit comprises a circuit for communicating with the timing detection unit configured as a cover open detection unit configured to detect whether a platen cover is opened or closed, and the method further comprises transferring, by the control unit, the power saving mode to the normal mode upon detecting that the platen cover is opened through the integrated circuit in the power saving mode.

15. The method for controlling an image scanner according to claim 14, further comprising:

activating, by the control unit, the original size detection unit through the integrated circuit when transferring the power saving mode to the normal mode; and detecting the size of the original by the original size detection unit upon the cover open detection unit detecting that the platen cover is in a process of being closed after detecting that the platen cover is opened.

16. The method for controlling an image scanner according to claim 10, further comprising supplying power from a single power supply to the normal mode circuit in the normal mode and to the power saving mode circuit in the power saving mode.

17. The method for controlling an image scanner according to claim 10, further comprising the step of resupplying power to and initializing the original size detection unit upon detection of an opening of a platen cover.

18. The method for controlling an image scanner according to claim 17, further comprising the step of immediately resupplying power to and initializing the original size detection unit upon detection of an opening of a platen cover.

* * * * *